(12) United States Patent
Schaffer et al.

(10) Patent No.: US 9,169,966 B2
(45) Date of Patent: Oct. 27, 2015

(54) COMPRESSION LIMITING CLIP FOR A BRACKET ASSEMBLY

(71) Applicant: Ford Global Technologies, LLC, Dearborn, MI (US)

(72) Inventors: Scott Allen Schaffer, Ypsilanti, MI (US); Dean Joseph DeAngelis, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 13/831,126

(22) Filed: Mar. 14, 2013

(65) Prior Publication Data

US 2014/0263901 A1    Sep. 18, 2014

(51) Int. Cl.
F16M 13/00    (2006.01)
F16M 13/02    (2006.01)
F02B 77/00    (2006.01)

(52) U.S. Cl.
CPC ............... F16M 13/02 (2013.01); F02B 77/00 (2013.01)

(58) Field of Classification Search
USPC .............. 248/580, 635, 903; 16/2.1; 277/639, 277/640; 294/131; 52/309.2; 59/93; 403/11, 403/23, 41
See application file for complete search history.

(56) References Cited

U.S. PATENT DOCUMENTS

| | | | | |
|---|---|---|---|---|
| 2,804,900 A * | 9/1957 | Lifton | 403/23 |
| 2,853,113 A * | 9/1958 | Balint et al. | 411/103 |
| 3,366,356 A * | 1/1968 | Fisher | 248/56 |
| 4,053,701 A * | 10/1977 | Ogilvie et al. | 174/481 |
| 4,232,496 A | 11/1980 | Warkentin | |
| 4,270,591 A * | 6/1981 | Gill et al. | 411/112 |
| 4,302,532 A | 11/1981 | Wallshein | |
| 5,261,658 A * | 11/1993 | Nagai | 271/297 |
| 5,523,142 A | 6/1996 | Bedoussac | |
| 5,806,140 A * | 9/1998 | Carlson et al. | 16/2.1 |
| 5,950,277 A * | 9/1999 | Tallmadge et al. | 16/2.1 |
| 6,061,870 A * | 5/2000 | Dodge et al. | 16/2.1 |
| 6,147,307 A * | 11/2000 | Ling et al. | 174/659 |
| 6,364,076 B1 * | 4/2002 | Braun et al. | 188/327 |
| 6,376,777 B1 * | 4/2002 | Ito et al. | 174/152 G |
| 6,804,872 B2 * | 10/2004 | Powell | 29/525.11 |
| 6,964,233 B2 * | 11/2005 | Peach et al. | 105/406.1 |
| 7,207,762 B2 * | 4/2007 | Teal | 411/526 |
| 7,527,464 B2 * | 5/2009 | Stewart et al. | 411/107 |
| 7,699,571 B2 | 4/2010 | Booher et al. | |
| 7,781,684 B2 * | 8/2010 | Stuckmann et al. | 174/650 |
| 8,522,642 B2 * | 9/2013 | Kaijala | 74/560 |
| 8,628,054 B2 | 1/2014 | Kaybidge et al. | 248/580 |
| 2003/0097728 A1 * | 5/2003 | Tisol et al. | 16/2.1 |
| 2008/0047095 A1 * | 2/2008 | Weiss et al. | 16/2.1 |
| 2008/0157483 A1 | 7/2008 | Booher et al. | |
| 2009/0272872 A1 * | 11/2009 | Hoffman et al. | 248/673 |
| 2010/0154162 A1 * | 6/2010 | Ramirez Blanco et al. | 16/2.1 |
| 2013/0277528 A1 * | 10/2013 | Ko | 248/636 |
| 2014/0033474 A1 * | 2/2014 | Violato | 16/2.1 |
| 2014/0150204 A1 * | 6/2014 | Grummett et al. | 16/2.1 |

* cited by examiner

Primary Examiner — Bradley Duckworth
(74) Attorney, Agent, or Firm — Greg P. Brown; Price Heneveld LLP

(57) ABSTRACT

A bracket assembly includes a polymer bracket that has a first side, a second side, and an opening that extends between the first and second sides. A compression limiting clip includes a plate portion coupled with the second side. A member borders at least a portion of the opening and extends orthogonally from the plate portion through the opening for receiving compression from a fastener engaging the polymer bracket.

20 Claims, 3 Drawing Sheets

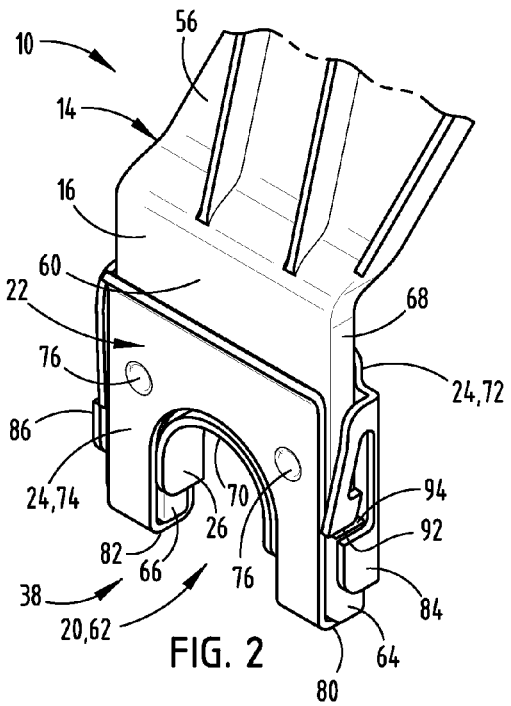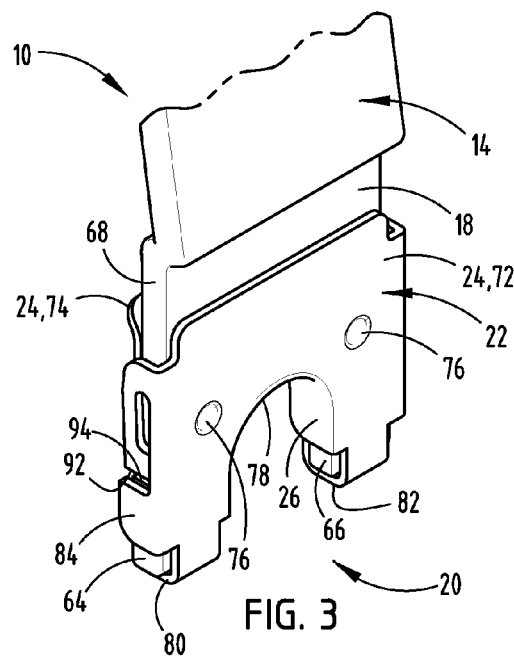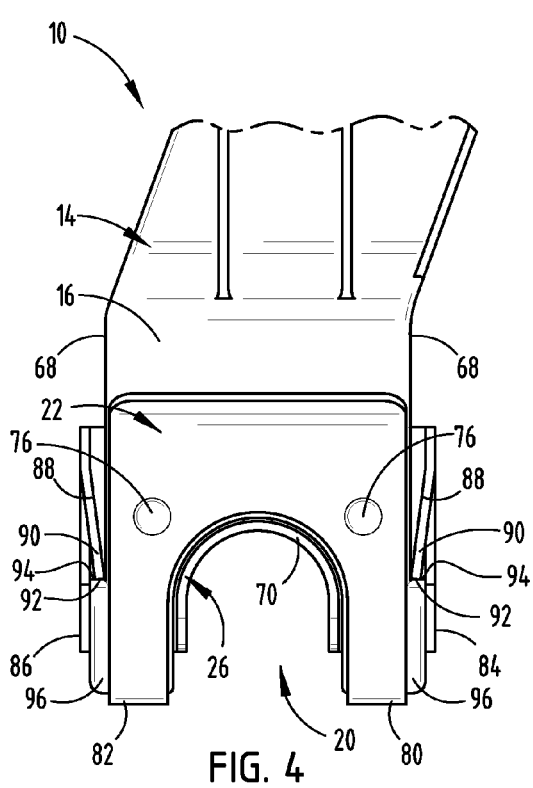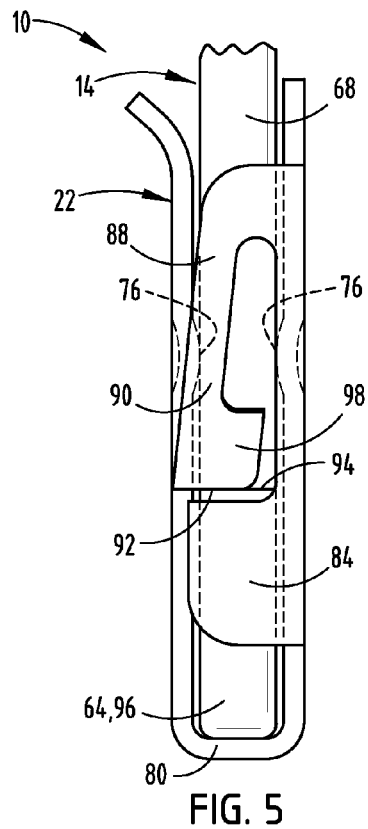

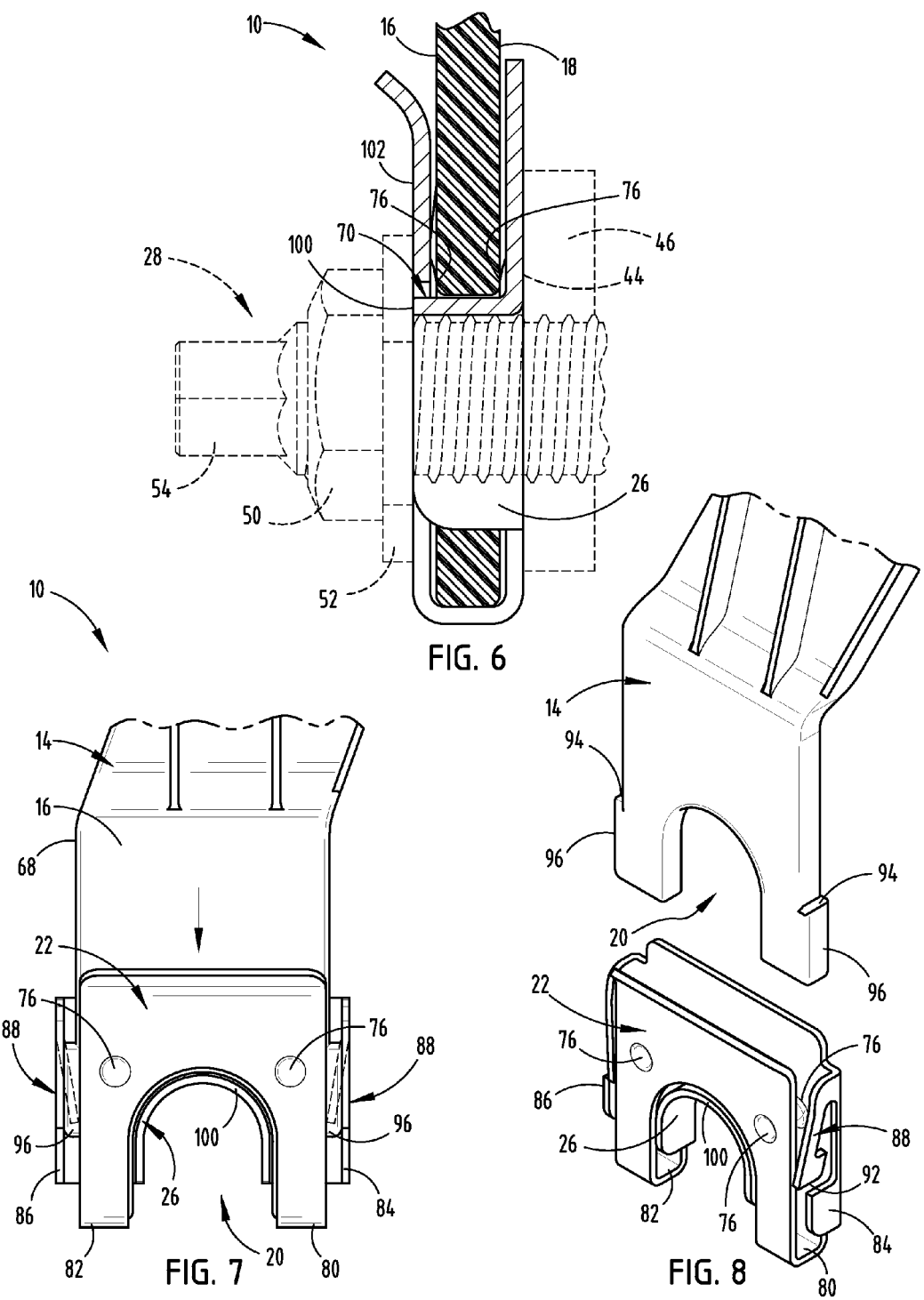

COMPRESSION LIMITING CLIP FOR A BRACKET ASSEMBLY

FIELD OF THE INVENTION

The present invention generally relates to a compression limiting clip, and more particularly to a compression limiting clip for a bracket assembly on a vehicle.

BACKGROUND OF THE INVENTION

It is common for vehicles to have components, including portions of the engine and other components within the engine compartment, such as shrouds, conduits, and covers, to include rigid metal brackets that are mounted to portions of the engine. Traditionally, these brackets were mostly constructed of metal materials to provide a rigid framework within the engine compartment. However, due to the increasing desire to reduce weight and improve vehicle efficiency without compromising safety of the vehicle, it is becoming more common to replace heavy metal portions of the vehicle, such as these metallic brackets, with lightweight materials, such as polymer and fiber composites, that are able to provide similar rigidity and support.

SUMMARY OF THE INVENTION

According to one aspect of the present invention, a bracket assembly includes a polymer bracket that has a first side, a second side, and an opening that extends between the first and second sides. A compression limiting clip includes a plate portion coupled with the second side. A member borders at least a portion of the opening and extends orthogonally from the plate portion through the opening for receiving compression from a fastener engaging the polymer bracket.

According to another aspect of the present invention, a clip for limiting compression of a non-metallic bracket includes first and second plates extending over respective first and second sides of the bracket. A flange extends between the first and second plates to engage the bracket proximate an opening. A rigid member extends orthogonally from the second plate and borders a portion of the opening for engaging a fastener extending through the opening.

According to yet another aspect of the present invention, a bracket assembly for a mounting surface includes a bracket having an end portion that has a slot. A fastener has a nut threadably coupled with a stud extending from the mounting surface through the slot. A clip is coupled with the end portion and includes a plate portion between the mounting surface and the bracket. A rigid member extends orthogonally from the plate portion adjacent to the stud and engages the nut.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is a front top perspective view of the bracket assembly;

FIG. 3 is a rear top perspective view of the bracket assembly;

FIG. 4 is a front elevational view of the bracket assembly;

FIG. 5 is a side elevational view of the bracket assembly;

FIG. 6 is a cross sectional side view of the bracket assembly, taken at line VI-VI of FIG. 1A;

FIG. 7 is a front elevational view of a compression limiting clip partially removed from an end portion of a bracket of the bracket assembly; and FIG. 8 is an exploded top perspective view of the bracket assembly, showing the compression limiting clip disengaged from the bracket.

DETAILED DESCRIPTION OF THE PREFERRED EMBODIMENTS

Figure 1:
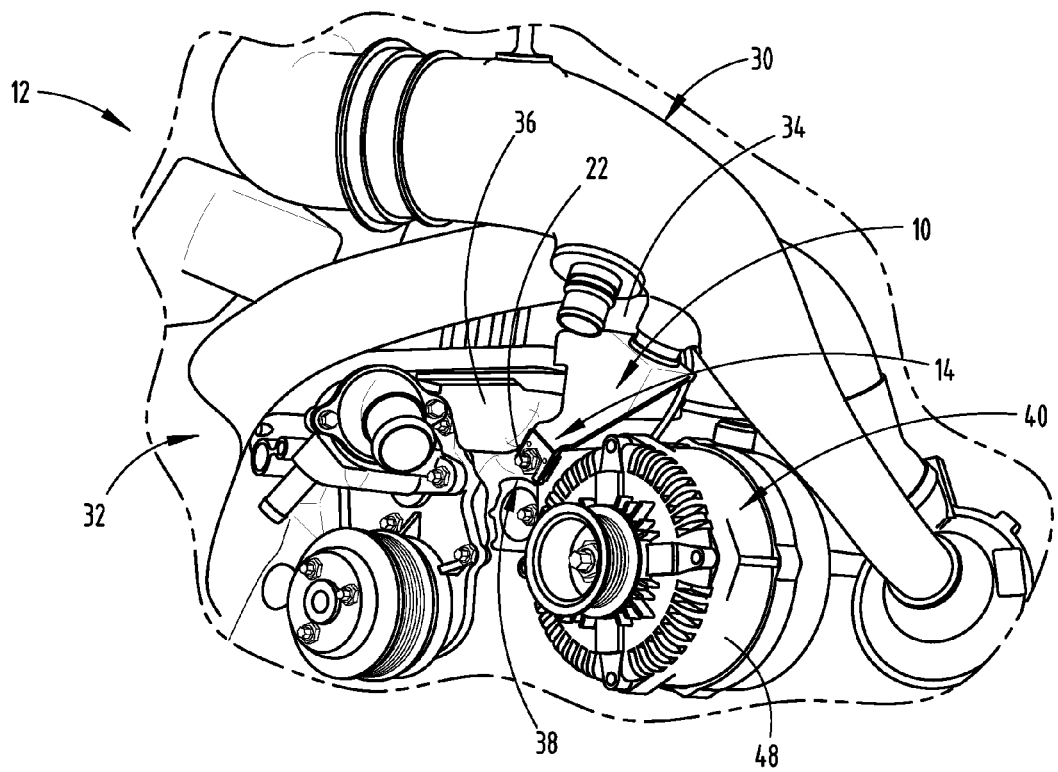
FIG. 1 is a top perspective view of a vehicle engine having a bracket assembly, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-8, reference numeral 10 generally designates a bracket assembly for a vehicle 12, that includes a polymer bracket 14 having a first side 16, a second side 18, and an opening 20 that extends between the first and second sides 16, 18. A compression limiting clip 22 includes a plate portion 24 coupled with the second side 16. A member 26 borders at least a portion of the opening 20 and extends orthogonally from the plate portion 24 through the opening 20 for receiving compression from a fastener 28 engaging the polymer bracket 14.

Figure 1A:
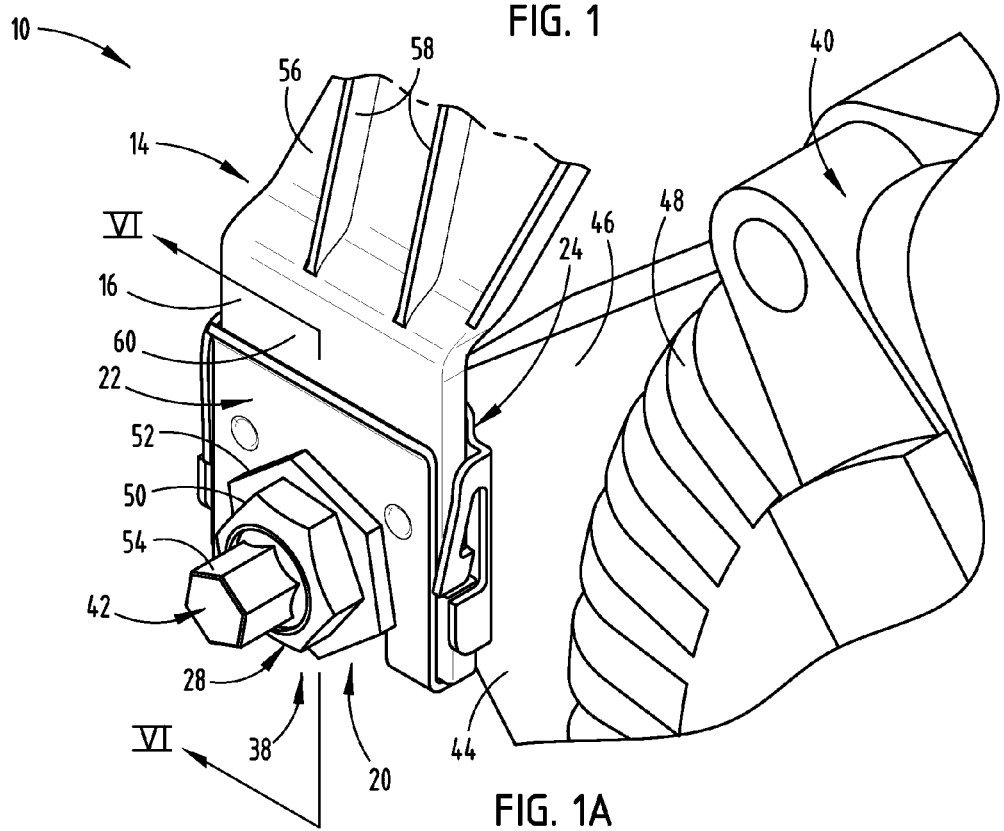
FIG. 1A is a top perspective view of the bracket assembly engaging a mounting surface on an alternator of the vehicle engine.

Referring now to FIGS. 1-1A, a portion of an engine 30 within an engine compartment 32 of the vehicle 12 is shown as an environmental view having some components of the engine 30 removed, such as belts, to show the relative location of one embodiment of the bracket assembly 10. The bracket 14 of the bracket assembly 10 extends from a cam cover 34 of the engine 30 that conceals at least one cam shaft of the engine 30 and engages the engine block 36. Accordingly, the polymer bracket 14 extends down to an end portion 38 that couples with an alternator 40 of the engine 30. More specifically, in the illustrated embodiment, the alternator 40 includes a threaded stud 42 of the fastener 28 extending orthogonally from a mounting surface 44 of the alternator 40. Due to the space constraints proximate the alternator 40 and the mounting surface 44, the end portion 38 of the polymer bracket 14 includes the opening 20 that is engaged by the fastener 28, such that the polymer bracket 14 does not extend downward substantially beyond the fastener 28. However, it is contemplated that the fastener 28 of the present invention may engage the bracket 14 at alternative locations on the bracket 14 using an alternatively oriented compression limiting clip 22.

As further illustrated in FIG. 1A, the mounting surface 44 on the alternator 40 is disposed on a mounting member 46 that extends outward from a rotor housing 48 of the alternator 40. The fastener 28 extends orthogonally from the mounting surface 44 in generally parallel alignment with a rotor coaxially contained within the rotor housing 48 of the alternator 40.

The threaded stud 42 extends outward from the mounting surface 44 to engage the end portion 38 of the bracket 14 and to threadably couple with a nut 50 of the fastener 28. The nut 50 threadably engages a distal portion of the stud 42 and includes a washer 52 between the nut 50 and the bracket 14. In addition, an end cap 54 is included on the opposing side of the nut 50 from the washer 52 to conceal the distal portion of the stud 42. As also shown, the end portion 38 of the bracket 14 includes a neck region 56 that has structural flanges 58 extending downward along the first side 16 of the neck region 56 and leading to a head region 60 of the bracket 14. It is conceivable that the bracket 14, including the end portion 38, may include alternative shapes and arrangements to engage a stud 42 and mounting surface 44. In addition, it is also conceivable that the mounting surface 44 may be alternatively located on another component of the engine 30, another component of the vehicle 12, or elsewhere. The fastener 28 may also conceivably include alternative means to attach the end portion 38 of the bracket 14 to the mounting surface 44 with sufficient compression to retain the bracket 14 to the mounting surface 44 under the influences of vibration from the engine 30 and other vehicle movement, as understood by one having ordinary skill in the art.

As shown in FIG. 2, the opening 20 in the bracket 14 extends through the bracket 14 between the first and second sides 16, 18 and includes a slot 62 having a U-shape. The slot 62 in the end portion 38 of the bracket 14 defines a first leg 64 and a second leg 66 of the bracket 14 that extend downward in substantially parallel alignment on opposing sides of the U-shaped slot 62. The first and second legs 64, 66 also include a substantially equivalent width between an edge portion 68 of the bracket and the U-shaped slot 62. The slot 62 is bordered partially by the rigid member 26 of the clip 22, which has a curvature following the U-shape of the slot 62. The curvature of the rigid member 26 spans along the slot 62 between the first and second legs 64, 66. As illustrated, a distal end 70 of the rigid member 26 similarly includes the curvature such that the rigid member 26 has a U-shaped cross-section that extends continuously from the distal end 70 to a second plate 72 of the plate portion 24 of the clip. It is conceivable that the rigid member 26 may include alternative shapes and arrangements, such as a segmented arrangement, to receive compression from the fastener 28.

As illustrated in FIGS. 2-3, a first plate 74 and the second plate 72 similarly span over the first side 16 and second side 18 of the bracket 14, respectively. The first and second plates 74, 72 extend upward in generally parallel alignment and terminate at upper ends to define a height substantially equivalent to each other. The first and second plates 74, 72 also span laterally between the edge portions 68 of the bracket 14 to define a width substantially equivalent to each other. The first and second plates 74, 72 also each include a pair of circular indentations 76 that protrude inward towards the bracket. The indentations 76 hold the bracket slightly away from the interior planar surfaces of the first and second plates 74, 72. It is contemplated that the indentations 76 may include alternative shapes, quantity, and depth, and may otherwise be excluded. It is also conceivable that the first and second plates 74, 72 may include open areas or alternative shapes that engage the first and second sides 16, 18 of the bracket 14, respectively.

As further illustrated in FIG. 3, the rigid member 26 integrally extends from a concave central edge 78 of the second plate 72 proximate the U-shaped slot 62 in the bracket. The first and second plates 74, 72 are connected by a first and second flange 80, 82 that extend proximate the first and second legs 64, 66 of the bracket, respectively. Accordingly, the flanges 58 provide an abutment that contacts the distal edge portion 68 of each of the first and second legs 64, 66. The flanges 58 also bias the first and second plates 74, 72 toward each other to provide additional retention of the clip to the bracket. The second plate 72 also includes a first sidewall 84 and second sidewall 86 extending orthogonally from the lateral outside edges of the second plate 72 adjacent to the edge portions 68 of the bracket. The first and second sidewalls 84, 86 provide lateral retention of the clip to the bracket and prevent lateral movement of the clip relative to the bracket.

Referring now to FIGS. 4-5, the compression limiting clip 22 also includes a pair of attachment features 88 extending orthogonally from the second plate 72 above and in general alignment with the first and second sidewalls 84, 86. The pair of attachment features 88 operably couple with the edge portions 68 of the bracket 14 on the first and second legs 64, 66. More specifically, the attachment feature 88 includes a resilient element 90 that is biased inward toward the bracket 14 and connected to the second plate 72 proximate an upper portion of the outer edges. The resilient elements 90 extend downward along the edge portion 68 of the bracket and terminate at a holding surface 92 of the resilient element 90 above the sidewalls and are configured to abut retention surfaces 94 on the first and second legs 64, 66. The retention surfaces 94 are each formed by a distal protrusion 96 extending outwardly from the edge portions 68 of the first and second legs 64, 66. The retention surfaces 94 each include a substantially orthogonal surface relative to the edge portion 68. As the resilient element 90 of the attachment feature 88 extends downward, the width of the resilient element 90 increases proximate the holding surface 92, defining an enlarged portion 98 to sufficiently engage a substantial portion of the width of the retention surface 94, thereby vertically retaining the compression limiting clip 22 with the bracket 14. The attachment features 88 may also conceivably include alternative means to connect the cap 22 with the bracket 14 as generally understood by one having ordinary skill in the art At illustrated in FIG. 6, the rigid member 26 is shown extending orthogonally from the second plate 72 through the slot 62 in the bracket 14 to the distal end 70 thereof. The distal end 70 of the rigid member 26 includes a compression surface 100 that engages the washer 52 and the nut 50 of the fastener 28. The compression surface 100 is generally aligned with an exterior surface 102 of the first plate upon complete threaded engagement of the nut 50 on the stud 42, which slightly compresses the first plate toward the bracket 14, flexing about the flanges 58. Complete threaded engagement is generally defined as an M10 stud 42 with 10.5 Nm of torque, but may include a range of compression forces depending upon the desired characteristics of the compression limiting clip 22 and the corresponding compression limitations of the bracket 14. Accordingly, the compressive forces of the fastener 28 is defined between the an interior surface of the washer 52 and the mounting surface 44, such that the rigid member 26 primarily receives the compressive forces generated by the nut 50 threading onto the stud 42, thereby reducing compression of the bracket 14 and maintaining engagement of the bracket 14 with the mounting surface 44. To further facilitate the reduced compression on the bracket 14, the compression limiting clip 22 includes a metallic material having a material strength, including hardness and compressive strength, greater than the bracket 14. The bracket 14 may conceivably include a polymer material, a fiber composite material, such as wood or carbon fiber reinforced material, soft metals, and other materials having low hardness values and/or other characteristics making the advantages of the compression limiting clip 22 desired.

As shown in FIG. 7, the compression limiting clip 22 is partially removed from the end portion 38 of the bracket 14 by disengaging the attachment features 88 from the edge portion 68. To facilitate the removal, the resilient elements 90 of the attachment features 88 are flexed outward, moving the holding surface 92 out of engagement with the retention surface 94 of the bracket 14. To flex the resilient elements 90 outward, a laterally upward force is applied to the resilient elements 90 causing them to flex proximate the second plate 72 near an upper portion of the resilient element 90. Upon disengaging the holding surface 92 with the engagement surface, the compression limiting clip 22 may slide out of engagement with the end portion 38 of the bracket 14 by sliding downward in alignment with the first and second legs 64, 66 until the clip is completely removed, as shown in FIG. 8.

Similarly, with reference to FIGS. 7-8, to insert the compression limiting clip 22 on the bracket 14, the bracket is slid in the opposite direction aligning the U-shaped rigid member 26 with the U-shaped slot 62 on the end portion 38 of the bracket 14. Engagement of the clip is achieved upon the rigid member 26 substantially engaging the U-shaped portion of the slot 62 and the resilient elements 90 of the attachment features 88 flexing inward above the distal protrusions 96 to cause the retention surfaces 94 to abut the holding surfaces 92 of the resilient elements 90. Such a sliding engagement allows the compression limiting clip 22 to be installed in constricted areas of the engine compartment 32 of the vehicle 12, providing the added benefit of engine compartments 32 to include brackets 14 having polymeric materials or other materials that may be damaged or weakened under compression. Further, these engine compartments 32 are increasingly being constricted in size in small and large vehicles and incorporated with lighter weight components to increase vehicle efficiency, as generally understood by one having ordinary skill in the art.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A bracket assembly, comprising:
   a polymer bracket having first and second sides and an opening defined by an end portion of the polymer bracket;
   a compression limiting clip including:
      a plate portion coupled with the second side; and
      a member bordering at least a portion of the opening and extending orthogonally from an outer edge of the plate portion through the opening for receiving compression from a fastener engaging the polymer bracket.

2. The bracket assembly of claim 1, wherein the opening includes an open ended slot on the end portion of the bracket defining a first leg and a second leg of the bracket.

3. The bracket assembly of claim 2, wherein the open ended slot has a U-shape and the member includes a curvature following the U-shape of the slot between the first and second legs.

4. The bracket assembly of claim 2, wherein the member integrally extends from an edge of the plate portion and the plate portion engages the first side of the first and second legs.

5. The bracket assembly of claim 1, wherein the compression limiting clip includes a flange extending from the plate portion over an edge portion of the bracket that connects between the first and second sides.

6. The bracket assembly of claim 5, wherein the compression limiting clip includes an inwardly-biased attachment feature operably coupled with the edge portion of the bracket, wherein the attachment feature is biased toward the member.

7. The bracket assembly of claim 1, wherein the fastener includes a stud extending from a mounting surface and a threaded nut coupled with the stud, and wherein the polymer bracket and the member are disposed between the mounting surface and the threaded nut.

8. The bracket assembly of claim 1, wherein the compression limiting clip includes a metallic material having a material strength greater than the polymer bracket.

9. A clip for limiting compression of a non-metallic bracket, comprising:

first and second plates extending over respective first and second sides of the bracket;

a flange extending between the first and second plates for engaging the bracket proximate an opening; and a rigid member extending orthogonally from the second plate, free of engagement with the first plate and the flange, and bordering a portion of the opening for engaging a fastener extending through the opening, wherein the flange and the rigid member each extend perpendicularly from the second plate toward the first plate.

10. The clip of claim 9, wherein the flange extends over an edge portion of the bracket that connects between the first and second sides of the bracket.

11. The clip of claim 10, wherein the opening includes a slot on the end portion of the bracket defining a first leg and a second leg of the bracket, and wherein the rigid member includes a curvature extending between the first and second legs.

12. The clip of claim 11, further comprising:

an attachment feature operably coupled with the edge portion of the bracket on at least a select one of the first and second legs of the bracket.

13. The clip of claim 9, wherein the rigid member extends adjacent to the fastener to a distal end of the rigid member that abuts a perpendicular retention surface of the fastener.

14. The clip of claim 13, wherein the rigid member includes a U-shaped cross section that surrounds a stud portion of the fastener and extends continuously from the second plate to the distal end.

15. A bracket assembly, comprising:

a bracket having an end portion defining an open ended slot;

a fastener having a nut threadably coupled with a stud extending from a mounting surface through the slot; and a clip coupled with the end portion and including:

a plate portion between the mounting surface and the bracket; and a rigid member extending orthogonally from a U-shape edge of the plate portion adjacent to the stud and engaging the nut.

16. The bracket assembly of claim 15, wherein the rigid member receives compressive force between the nut and the mounting surface for reducing compression of the bracket.

17. The bracket assembly of claim 15, wherein the slot has a U-shape defining a first leg and a second leg of the bracket, and wherein the rigid member includes a curvature following the U-shape of the slot between the first and second legs.

18. The bracket assembly of claim 17, wherein the clip includes an attachment feature operably coupled with an edge portion of the bracket on at least a select one of the first and second legs of the bracket.

19. The bracket assembly of claim 15, wherein the rigid member includes a U-shaped cross section that surrounds the stud portion of the fastener and extends continuously from the plate portion to the nut.

20. The bracket assembly of claim 15, wherein the compression limiting clip includes a metallic material having a material strength greater than the bracket.

* * * * *